(12) United States Patent
Inn et al.

(10) Patent No.: US 7,215,108 B2
(45) Date of Patent: May 8, 2007

(54) METHOD FOR STARTING A VOLTAGE-MODE SWITCHING POWER SUPPLY INTO A BIASED LOAD

(75) Inventors: Bruce L. Inn, San Jose, CA (US); Ramesh Selvaraj, Santa Clara, CA (US)

(73) Assignee: Micrel, Inc., San Jose, CA (US)

( * ) Notice: Subject to any disclaimer, the term of this patent is extended or adjusted under 35 U.S.C. 154(b) by 322 days.

(21) Appl. No.: 11/035,908

(22) Filed: Jan. 14, 2005

(65) Prior Publication Data

US 2006/0158169 A1    Jul. 20, 2006

(51) Int. Cl.
*G05F 1/565*    (2006.01)
(52) U.S. Cl. .................. 323/285; 323/299; 323/901
(58) Field of Classification Search ............ 323/282, 323/284, 285, 299, 901
See application file for complete search history.

(56) References Cited

U.S. PATENT DOCUMENTS

| | | | | |
|---|---|---|---|---|
| 4,823,070 A | * | 4/1989 | Nelson ................... | 323/285 |
| 4,967,138 A | * | 10/1990 | Obergfell et al. ........... | 323/224 |
| 6,370,045 B1 | * | 4/2002 | Lurkens ................... | 363/21.12 |
| 6,593,725 B1 | * | 7/2003 | Gallagher et al. .......... | 323/284 |
| 6,954,054 B2 | * | 10/2005 | Brown ..................... | 323/283 |
| 7,012,413 B1 | * | 3/2006 | Ye ............................ | 323/284 |
| 7,095,215 B2 | * | 8/2006 | Liu et al. .................. | 323/222 |

* cited by examiner

*Primary Examiner*—Jeffrey Sterrett
(74) *Attorney, Agent, or Firm*—Patent Law Group LLP; Carmen C. Cook

(57) ABSTRACT

A method for starting up a voltage-mode switching power supply into a biased load includes computing a ratio of the load voltage at the biased load to an input voltage of the switching power supply, generating a first signal indicative of the duty cycle of the voltage-mode switching power supply, comparing the first signal indicative of the duty cycle to the ratio, and turning on an output stage of the voltage-mode switching power supply only when the first signal indicative of the duty cycle is equal to the ratio. In this manner, the voltage-mode switching power supply can be started up to supply power to a biased load without dragging down the load voltage of the biased load.

11 Claims, 1 Drawing Sheet

METHOD FOR STARTING A VOLTAGE-MODE SWITCHING POWER SUPPLY INTO A BIASED LOAD

FIELD OF THE INVENTION

The invention relates to voltage-mode switching power supplies and, in particular, to a method for starting a voltage-mode switching power supply into a biased load.

DESCRIPTION OF THE RELATED ART

In many electronic systems, when the system is not in use, the de rigueur switching regulator that supplies power to the system during normal operation is turned off and a small "keep-alive" regulator maintains the system power at a voltage just sufficient to retain data and logical state information. FIG. 1 is a block diagram illustrating an exemplary electronic system whereby a load, representing components of the electronic system to be powered, is powered in a full-power mode by a main power supply and in a power-down mode by a keep-alive power supply. The main power supply provides the full system voltage (e.g. 2.5 volts) when the system is in use and is turned off when the system is not in use. When the main power supply is turned off, the keep-alive power supply provides a "keep-alive" potential (e.g. 1.0 volt) to the load. A pair of switches, typically implemented using MOS transistors, is used to select the desired power supply depending on the mode of operation.

For the type of systems shown in FIG. 1, the main power supply is typically implemented as a "voltage-mode" switching power supply because a voltage-mode switching power supply is commonly-available, economical, and noise-tolerant. However, using a voltage-mode switching power supply in a system with back-up power such as that shown in FIG. 1 is problematic. This is because a salient characteristic of a voltage-mode switching power supply is that it operates to bring up its output voltage from zero volts. It is therefore problematic to start a voltage-mode switching power supply into a biased load, which sits at a non-zero voltage during the start up period of the switching power supply.

More specifically, when the system of FIG. 1 is in the power-down mode, the main power supply is turned off and the power rail voltage of the load is biased to the keep-alive potential by the keep-alive power supply. When the system switches to the full-power mode, the voltage-mode switching power supply, acting as the main power supply, turns on and causes the power rail voltage at the load to drop from the keep-alive voltage down to virtually zero voltages before the voltage-mode switching power supply raises the power rail voltage to the steady-state full power level. The drop in power rail voltage at the load during the switch-over from the keep-alive power supply to the main power supply is undesirable as it will cause the system to lose the data or logical states stored in the system by the keep-alive power supply.

The start-up operation of a voltage-mode switching power supply can be described briefly as follows. To soft-start a voltage-mode switching power supply, the duty cycle is made very small initially and then the duty cycle is gradually brought up to where it will be at steady state. On an average basis, for a duty cycle of D, the effective voltage at the switching output voltage ($V_{SW}$) node of the switching power supply is D*Vin. If the DC output voltage $V_{OUT}$ at the output voltage node is at zero volts, then the voltage-mode switching power supply will start up normally and current will flow out of the output inductor into the output voltage node that is coupled to the load.

However, if the DC output voltage is already at a certain biased voltage above zero, then at start-up, the voltage at the output voltage node is higher than the average switching voltage at the switching output voltage node and current will flow back through the output inductor into the switching transistors of the voltage-mode switching power supply. The reverse current flow will continue until the duty cycle of the switching regulator reaches a level where the average output voltage is the same as the output voltage at the output voltage node. The reverse flow of current into the main power supply is undesirable because it may cause the output voltage at the load, being biased by the keep-alive power supply, to drop.

In some cases, a current-mode switching power supply may be used as the main power supply. A current mode controlled power supply can start into a biased load because it adjusts the duty cycle so as to obtain a positive inductor current (where positive current is defined as current going into the load). This is a consequence of the fundamental operation of a current-mode switching power supply, which revolves around the forcing of the inductor current to be equal to a value determined by the voltage sensing circuit. In contrast, the voltage-mode switching power supply the duty cycle based solely on the value of the load voltage independent of the direction or magnitude of the inductor current. While using a current-mode switching power supply solves the problem of drawing down the load bias voltage at start-up, the current-mode switching power supply is more difficult to implement and sometimes more noise-sensitive.

SUMMARY OF THE INVENTION

According to one embodiment of the present invention, a method for starting up a voltage-mode switching power supply is described. The voltage-mode switching power supply receives an input voltage and provides a regulated DC output voltage at a DC output voltage terminal. The voltage-mode switching power supply is operated to provide a final DC output voltage having a first value. The DC output voltage terminal is coupled to a load where the load is biased to a load voltage having a second value greater than zero and less than the first value. The method includes computing a ratio of the load voltage having the second value to the input voltage, generating a first signal indicative of the duty cycle of the voltage-mode switching power supply, comparing the first signal indicative of the duty cycle to the ratio, and turning on an output stage of the voltage-mode switching power supply only when the first signal indicative of the duty cycle is equal to the ratio. The output stage generates a second signal having an average value corresponding to the DC output voltage at the DC output voltage terminal.

According to another embodiment of the present invention, a voltage-mode switching power supply includes an input terminal receiving an input voltage, a switching output terminal providing a first signal indicative of a regulated DC output voltage, and a DC output voltage terminal providing the regulated DC output voltage. The voltage-mode switching power supply further includes an error amplifier, a control circuit, an output stage, a duty cycle calculator, and a comparator. The error amplifier has a first input node coupled to receive a feedback voltage corresponding to the regulator DC output voltage, a second input node coupled to a first reference voltage and an output node providing an error voltage indicative of the difference between the feedback voltage and the reference voltage. The control circuit includes a first input node receiving the error voltage, a second input node receiving an enable signal, and an output node providing one or more control signals in response to the error voltage where the control signals have a duty cycle determined by the error voltage. The output stage is coupled to receive the one or more control signals and to generate the first signal indicative of the regulated DC output voltage. The duty cycle calculator circuit is coupled to receive the input voltage and a first voltage where the first voltage is greater than zero and less than a final value of the regulated DC output voltage. The duty cycle calculator circuit provides a duty cycle preset signal indicative of the ratio of the first voltage to the input voltage. The comparator includes a first input node receiving the error voltage and a second input node receiving the duty cycle preset signal where the comparator provides the enable signal.

In operation, the enable signal is asserted when the error voltage is equal to the duty cycle preset signal. The enable signal is asserted to cause the control circuit to generate the one or more control signals for driving the output stage.

The present invention is better understood upon consideration of the detailed description below and the accompanying drawings.

DETAILED DESCRIPTION OF THE PREFERRED EMBODIMENTS

In accordance with the principles of the present invention, a circuit and method for starting up a voltage-mode switching power supply allows the voltage-mode switching power supply to start up and supply power to a biased load without dragging down the load voltage at the biased load. Specifically, the start-up circuit and method of the present invention operate to allow the voltage-mode switching power supply to start switching only when the power supply's output voltage is approximately equal to the voltage of the biased load. In this manner, when the voltage-mode switching power supply is started up to supply power to a biased load, the existing voltage at the biased load is preserved and loss of saved data or logical states at the load is prevented.

The start-up circuit and method of the present invention are applicable in voltage-mode switching power supplies and are particularly useful for voltage-mode switching power supplies that are used as the main power supplies for electronic systems incorporating a standby power supply. In such systems, the voltage-mode switching power supply provides the full power to the load in a full-power mode when the system is in use. The voltage-mode switching power supply is turned off during a power-down mode or standby mode when the system is not in use and a standby power supply supplies a standby potential to the load. When the system switches to full-power mode again, the voltage-mode switching power supply turns back on to supply full power to the load. By incorporating the start-up circuit of the present invention in the voltage-mode switching power supply, the voltage-mode switching power supply can be started up without dragging down the standby voltage already existing at the biased load supplied by the standby power supply.

Figure 1:
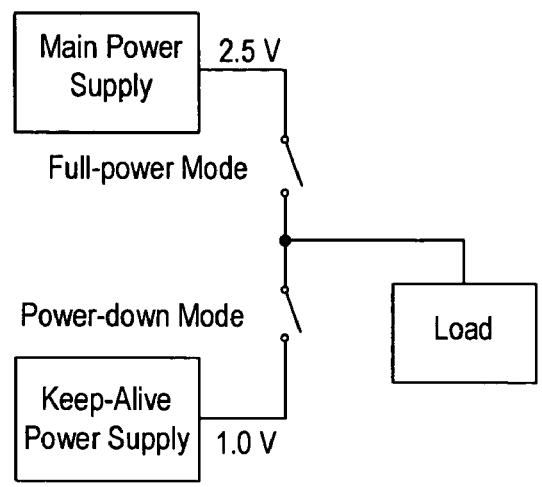
FIG. 1 is a block diagram illustrating an exemplary electronic system powered by a main power supply and a keep-alive power supply.
Figure 2:
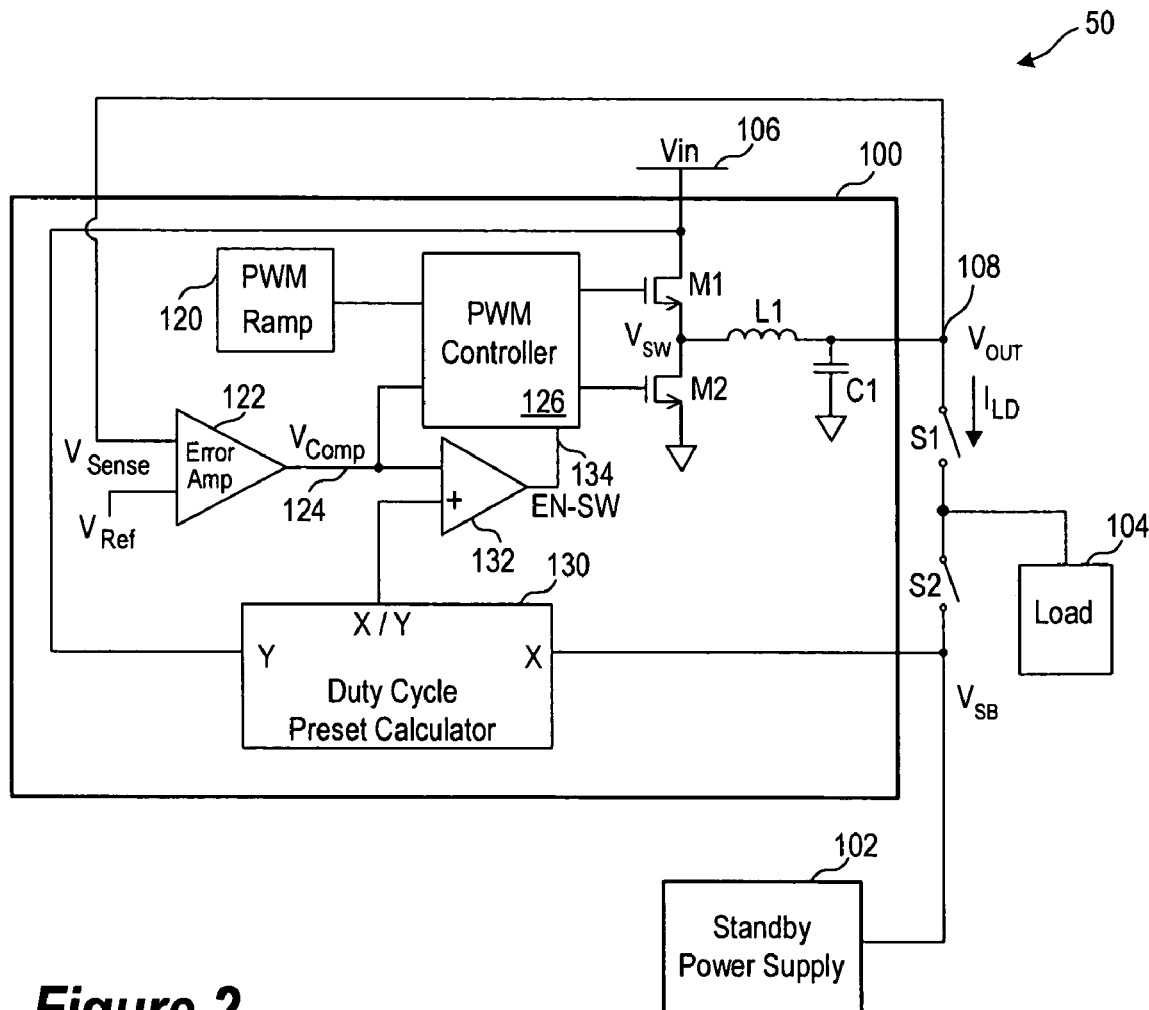
FIG. 2 is schematic diagram of a system incorporating a voltage-mode switching power supply as the main power supply whereby the voltage-mode switching power supply implements the start-up method of the present invention for starting into a biased load.

FIG. 2 is schematic diagram of a system incorporating a voltage-mode switching power supply as the main power supply whereby the voltage-mode switching power supply implements the start-up method of the present invention for starting into a biased load. Referring to FIG. 2, system 50 includes a voltage-mode switching power supply 100 ("power supply 100") as the main power supply and a standby power supply 102 as the standby power supply. Both of the power supplies are switchably connected to a load 104 through switches S1 and S2 for supply power to the load. When system 50 is in use, switch S1 is closed so that power supply 100 supplies the desired full system voltage to load 104. When system 50 is not in use, power supply 100 is turned off and system 50 enters the standby mode. Switch S2 is closed and standby power supply 102 supplies a standby voltage VSB to load 104 to maintain the data or logical states stored in load 104. Thus, in system 50, the voltage at load 104 is therefore always maintained at least at the standby voltage $V_{SB}$. When system 50 is put back in full-power mode, power supply 100 is turned on and will proceed to increase the voltage at load 104 from standby voltage VSB to the desired full power voltage, in accordance with the start-up method of the present invention.

FIG. 2 illustrates an exemplary configuration of a voltage-mode switching power supply and further illustrates the implementation of the start-up circuit and method of the present invention in a voltage-mode switching power supply. It is understood that the exact configuration of the voltage-mode switching power supply is not critical to the practice of the present invention. The start-up circuit and method of the present invention can be incorporated in voltage-mode switching power supplies of various configurations to allow the voltage-mode switching power supplies to start-up into a biased load. Moreover, the box 100 in FIG. 2 denotes components of the voltage mode switching power supply which may or may not be formed on a single integrated circuit. For instance, inductor L1 and capacitor C1 are often formed using discrete components.

Referring to FIG. 2, voltage-mode switching power supply 100 receives an input voltage Vin on a node 106. The input voltage Vin is coupled to a pair of serially connected switching transistors M1 and M2 forming the output stage of the power supply. In the present illustration, switching transistors M1 and M2 are NMOS transistors and are controlled by a PWM controller 126. A switching output voltage $V_{SW}$ is provided at the common node between switching transistors M1 and M2. The switching output voltage $V_{SW}$ is coupled to an inductor-capacitor (LC) network including inductor L1 and capacitor C1 for filtering the switching output voltage $V_{SW}$ and generating a DC output voltage $V_{OUT}$ at a DC output voltage node 108 of substantially constant magnitude. It is well know that the duty cycle of the switching output voltage $V_{SW}$ multiplied by the input voltage Vin determines the magnitude of the DC output voltage $V_{OUT}$, and hence, the full power voltage provided by power supply 100. In other words, the average value of the switching output voltage $V_{SW}$ (avg($V_{SW}$)), given as the product of duty cycle D and input voltage Vin, is indicative of the DC output voltage $V_{OUT}$.

PWM controller 126 receives a PWM ramp signal from a PWM ramp generator 120 and an error voltage signal $V_{Comp}$ from an error amplifier 122. The output voltage $V_{OUT}$ is coupled back to error amplifier 122 for forming a feedback control loop for regulating the switching output voltage $V_{SW}$. Specifically, in FIG. 2, output voltage $V_{OUT}$ is fed back as a sensed voltage $V_{Sense}$ and is coupled to a first input terminal of error amplifier 122. A reference voltage $V_{Ref}$ is coupled to a second input terminal of error amplifier 122. Error amplifier 122 evaluates the difference between the sensed voltage $V_{Sense}$ and the reference voltage $V_{Ref}$ and provides the error voltage signal $V_{Comp}$ as an output signal to PWM controller 126. In operation, the error voltage signal $V_{Comp}$ determines the duty cycle of PWM controller 126. Based on the control of the error voltage signal $V_{Comp}$, PWM controller 126 drive switching transistors M1 and M2 to establish the desired switching output voltage $V_{SW}$ and ultimately the desired DC output voltage $V_{OUT}$.

In a conventional voltage-mode switching power supply, the power supply is started up by making the duty cycle very small initially and then gradually increasing the duty cycle up to where it will be at steady state. As discussed above, starting up a voltage-mode switching power supply into a biased load in a conventional manner will cause the output voltage $V_{OUT}$ to drop to virtually zero volts, which is undesirable.

According to one embodiment the present invention, voltage-mode switching power supply 100 implements the start-up method of the present invention whereby the output stage of the power supply is not allowed to switch until the duty cycle of the power supply reaches a level that will provide a DC output voltage $V_{OUT}$ that is equal to the voltage of the biased load. In this manner, when the output stage of the voltage-mode switching power supply is finally started up to supply power to a biased load, the power supply will not cause the existing voltage at the biased load to drop. Instead, the voltage-mode switching power supply will start up to provide a DC output voltage $V_{OUT}$ that is equal to the existing voltage of the biased load and will continue to increase the DC output voltage $V_{OUT}$ until the desired final voltage is reached.

FIG. 2 illustrates one embodiment of a start-up circuit that can be incorporated in voltage-mode switching power supply 100 to implement the start-up method of the present invention. In the implementation of FIG. 2, the output stage of the power supply, that is, transistors M1 and M2, do not start switching until the duty cycle of the power supply reaches a level where the average switching output voltage avg($V_{SW}$), indicative of the DC output voltage $V_{OUT}$, at least equals to the standby voltage $V_{SB}$.

Referring to FIG. 2, power supply 100 includes a duty cycle preset calculator 130 and a comparator 132. Duty cycle preset calculator 130 receives the standby voltage $V_{SB}$ as the X input value and the input voltage Vin as the Y input value and computes a ratio of X/Y as the duty cycle preset value. The ratio X/Y thus indicates the duty cycle value where power supply 100 can be started without dragging down the voltage at the biased load which is powered to the standby voltage $V_{SB}$. At comparator 132, the error voltage signal $V_{Comp}$ is compared against this duty cycle preset value to generate an enable signal EN-SW (node 134). Enable signal EN-SW is deasserted when voltage $V_{Comp}$ is less than the duty cycle preset value X/Y. Enable signal EN-SW is first asserted when voltage $V_{Comp}$ is equal to the duty cycle preset value X/Y and remains asserted when voltage $V_{Comp}$ is greater than the duty cycle preset value X/Y.

Enable signal EN-SW is coupled to PWM controller 126 in such a manner so as to cause PWM controller 126 to start operating switching transistors M1 and M2 only when the enable signal EN-SW is asserted. In this manner, the start-up circuit monitors the duty cycle of power supply 100 as indicated by voltage $V_{Comp}$. When voltage $V_{Comp}$ is less than the duty cycle preset value, enable signal EN-SW is deasserted so that PWM controller 126 does not turn on switching transistors M1 and M2. When voltage $V_{Comp}$ increases up to the duty cycle preset value, that is, when $V_{Comp}$ equals $V_{SB}$/Vin, the duty cycle of the power supply has increased to a sufficient level to allow the switching transistors to turn on. The enable signal EN-SW is then asserted and PWM controller 126 can start switching transistors M1 and M2 to generate the switching output voltage $V_{SW}$.

Thus, in accordance with the start-up method of the present invention, the error voltage signal $V_{Comp}$ is compared with the duty cycle preset value which is the ratio of the standby voltage to the input voltage and power supply 100 is turned on only when the error voltage signal $V_{Comp}$ equals to the duty cycle preset value. When error voltage signal $V_{Comp}$ equals to the duty cycle preset value, the average value of the switching output voltage (avg($V_{SW}$)) provided by transistors M1 and M2 is equal to the standby voltage $V_{SB}$ at which load 104 is biased. Thus, power supply 100 can be started up to supply power to the biased load without dragging down the voltage at the biased load. The relationship between the error voltage signal $V_{Comp}$ and the duty cycle D is given as:

$$D = V_{Comp}/V_R,$$

where $V_R$ is the peak-to-peak voltage of the ramp signal provided by PWM ramp generator 120. If voltage $V_{Comp}$ is zero, then the duty cycle is also zero duty cycle. If voltage $V_{Comp}$ is equals to $V_R$, then the duty cycle is 100%.

As discussed above, the average switching output voltage avg($V_{SW}$) is given as:

$$\text{avg}(V_{SW}) = D * V\text{in},$$

where the average switching output voltage avg($V_{SW}$) is equal to the DC output voltage $V_{OUT}$ (node 108) provided by the LC filter network. At start up of power supply 100, the DC output voltage $V_{OUT}$ of the power supply has to be at the same voltage level as the biased load to prevent degrading the voltage at the biased load. Thus, at start up, avg($V_{SW}$) should equal the standby voltage $V_{SB}$. By substituting and rearranging terms in the above two equations, the error voltage signal $V_{Comp}$ can be expressed as:

$$V_{Comp} = V_{SB} * VR/V\text{in}.$$

Thus, the error voltage signal $V_{Comp}$ is proportional to the ratio of the standby voltage, to which the biased load is held, and the input voltage Vin. By comparing voltage $V_{Comp}$ to the ratio of the standby voltage to the input voltage and using the result to enable the output stage of the voltage-mode switching power supply, the power supply can be turned on to supply full power to a biased load without any adverse effect. Specifically, when the voltage-mode switching power supply is turned on according to the method of the present invention, the DC output voltage $V_{OUT}$ of the power supply is already at the standby voltage and thus the voltage at the biased load does not get dragged down.

Duty cycle preset calculator 130 in power supply 100 can be implemented in various manners known to those skilled in the art. In one embodiment, duty cycle preset calculator 130 is an analog divider operative to divide two DC voltages X and Y.

The above detailed descriptions are provided to illustrate specific embodiments of the present invention and are not intended to be limiting. Numerous modifications and variations within the scope of the present invention are possible. For example, in the configuration shown in FIG. 2, the voltage-mode switching power supply receives the DC output voltage $V_{OUT}$ as the feedback voltage to be compared with the reference voltage $V_{Ref}$. In other configurations, a stepped down version of the DC output voltage $V_{OUT}$ may be fed back to the error amplifier. The present invention is defined by the appended claims.

We claim:

1. A method for starting up a voltage-mode switching power supply, the voltage-mode switching power supply receiving an input voltage and providing a regulated DC output voltage at a DC output voltage terminal, the voltage-mode switching power supply being operated to provide a final DC output voltage having a first value, the DC output voltage terminal being coupled to a load wherein the load is biased to a load voltage having a second value greater than zero and less than the first value, the method comprising:

computing a ratio of the load voltage having the second value to the input voltage;

generating a first signal indicative of the duty cycle of the voltage-mode switching power supply;

comparing the first signal indicative of the duty cycle to the ratio; and turning on an output stage of the voltage-mode switching power supply only when the first signal indicative of the duty cycle is equal to the ratio, the output stage generating a second signal having an average value corresponding to the DC output voltage at the DC output voltage terminal.

2. The method of claim 1, wherein comparing the first signal indicative of the duty cycle of the voltage-mode switching power supply to the ratio comprises:

comparing an error voltage signal to the ratio, the error voltage signal being indicative of the difference between a voltage corresponding to the regulated DC output voltage at the DC output terminal and a reference voltage.

3. The method of claim 1, wherein turning on an output stage of the voltage-mode switching power supply only when the signal indicative of the duty cycle is equal to the ratio comprises:

disabling the output stage of the voltage-mode switching power supply when the first signal indicative of the duty cycle is less than the ratio; and enabling the output stage of the voltage-mode switching power supply when the first signal indicative of the duty cycle is equal to the ratio.

4. The method of claim 3, wherein the output stage of the voltage-mode switching power supply comprises one or more switching transistors, the one or more switching transistors being controlled by a PWM controller.

5. The method of claim 4, wherein disabling the output stage of the voltage-mode switching power supply comprises deasserting an enable signal coupled to the PWM controller, wherein the deasserting causes the PWM controller to turn off the one or more switching transistors.

6. The method of claim 4, wherein enabling the output stage of the voltage-mode switching power supply comprises asserting an enable signal coupled to the PWM controller, wherein the asserting causes the PWM controller to start controlling the one or more switching transistors to generate the second signal.

7. A voltage-mode switching power supply, comprising:

an input terminal receiving an input voltage;

a switching output terminal providing a first signal indicative of a regulated DC output voltage;

a DC output voltage terminal providing the regulated DC output voltage;

an error amplifier having a first input node coupled to receive a feedback voltage corresponding to the regulator DC output voltage, a second input node coupled to a first reference voltage and an output node providing an error voltage indicative of the difference between the feedback voltage and the reference voltage;

a control circuit comprising a first input node receiving the error voltage, a second input node receiving an enable signal, and an output node providing one or more control signals in response to the error voltage, the control signals having a duty cycle determined by the error voltage;

an output stage coupled to receive the one or more control signals and to generate the first signal indicative of the regulated DC output voltage;

a duty cycle calculator circuit coupled to receive the input voltage and a first voltage, the first voltage being greater than zero and less than a final value of the regulated DC output voltage, the duty cycle calculator circuit providing a duty cycle preset signal indicative of the ratio of the first voltage to the input voltage; and a comparator comprising a first input node receiving the error voltage and a second input node receiving the duty cycle preset signal, the comparator providing the enable signal;

wherein the enable signal is asserted when the error voltage is equal to or greater than the duty cycle preset signal, the enable signal being asserted to cause the control circuit to generate the one or more control signals for driving the output stage.

8. The voltage-mode switching power supply of claim 7, wherein the enable signal is deasserted when the error voltage is less than the duty cycle preset signal, the enable signal being deasserted to cause the control circuit to generate the one or more control signals for disabling the output stage.

9. The voltage-mode switching power supply of claim 7, wherein the output stage of the voltage-mode switching power supply comprises one or more switching transistors being controlled by the control circuit.

10. The voltage-mode switching power supply of claim 7, wherein the switching output terminal is coupled to an output filter circuit for generating the regulated DC output voltage.

11. The voltage-mode switching power supply of claim 7, wherein the duty cycle calculator circuit comprises an analog divider circuit for dividing the first voltage by the input voltage.

* * * * *